United States Patent [19]
Hoo et al.

[11] Patent Number: 5,100,236
[45] Date of Patent: Mar. 31, 1992

[54] TWO SERVO LOOP PASSIVE RING LASER GYROSCOPE

[75] Inventors: Kie L. S. Hoo, Anaheim; Timothy J. Valle, Long Beach, both of Calif.

[73] Assignee: Rockwell International Corporation, El Segundo, Calif.

[21] Appl. No.: 701,891

[22] Filed: Feb. 14, 1985

[51] Int. Cl.$^5$ .............................................. G01B 9/02
[52] U.S. Cl. ...................................... 356/350; 372/94
[58] Field of Search .......................... 372/94; 356/350

[56] References Cited

U.S. PATENT DOCUMENTS 4,352,562 10/1982 Minden .............................. 356/350

OTHER PUBLICATIONS

"Passive Ring Resonator Laser Gyroscope", S. Ezekiel and S. R. Balsamo, *Applied Physics Letters*, 1 May '77, pp. 478-480.

Sanders et al., "Passive Ring Resonator Method for Sensitive Inertial Rotation Measurements in Geophysics and Relativity", *Optical Society of America*, Nov. 1981, pp. 569-571.

*Primary Examiner*—Linda J. Wallace
*Attorney, Agent, or Firm*—H. Fredrick Hamann; George A. Montanye; Tom Streeter

[57] ABSTRACT

A passive ring resonator gyroscope comprising a single piece body having an integral first and second resonator cavity. The first resonator cavity contains a single frequency laser means to provide a sharply tuned single frequency light source to the second resonator cavity. The single frequency light source is sharply tuned and is split to form first and second sources. The second resonator cavity is a passive high Q cavity having a closed second optical path. The two light sources are fed to the second resonator and propagate as CW and CCW beams within the second resonator. A first servo tunes the frequency of the linear laser to the resonance peak of the CW beam in the second resonator. A second servo means is provided to shift the frequency of the CCW beam to its resonance peak. By converting both servo error outputs into frequency, the relative frequency difference between the CW and CCW beams are recorded as the frequency shift in response to the body rate rotation about the sensitive axis. The second resonator cavity is located and dimensioned in relation to the first resonator cavity to have similar path length changes in response to the induced body dimension changes.

14 Claims, 6 Drawing Sheets

TWO SERVO LOOP PASSIVE RING LASER GYROSCOPE

BACKGROUND OF THE INVENTION

1. Field of the Invention

The present invention relates to optical gyroscopes and more particularly to passive ring resonator gyroscopes; these have bias frequency errors resulting from mechanically or thermally induced dimensional changes that influence tuning.

2. Description of Prior Art

This application relates to an application titled "PASSIVE RING RESONATOR GYROSCOPE", filed Nov. 29, 1984, having Ser. No. 676,322, and having three inventors, two of which are common to this application and having a common assignee. This previous application described a laser gyro having a single piece body incorporating a linear laser light source, a passive resonant cavity and which relies on three active servo loops for operation.

In a passive ring resonator gyroscope, a pair of monochromatic light beams counterpropagate about closed-loop optical paths, where the paths form a resonator. The stability of the path length between reflective surfaces forming the closed path is critical in maintaining resonance in the passive ring resonator cavity since dimensional changes contribute to bias frequency errors. The relationship between a linear laser[1] and a ring resonator to form a prior art passive ring resonator gyro is depicted in an article by S. EZEKIEL and S. R. BALSAMO titled "A Passive Ring Laser Gyroscope", *Applied Physics Letters*, Vol. 30, No. 9, May 1, 1977, pg. 478-480. (NOTE: Usually a resonator is conceived as a linear or standing wave resonator in which the light completes an optical round trip by reflecting off a mirror and retracing its path. These forward and backward waves create a standing wave in the cavity. In a ring resonator, the light completes an optical round trip without retracing its path and hence the path encloses an area as shown in Ezekiel's paper.)

[1] For description of lasers and resonators refer to: Yariv, A., *QUANTUM ELECTRONICS* (John Wiley & Sons, 1975) or Sargent, M., et.al., *LASER PHYSICS* (Addison-Wesley Pub., 1974).

In the passive ring resonator, such as that described in the EZEKIEL reference, the two beams, traveling in opposite directions around the closed-loop optical path, are injected into the passive ring resonator from a single frequency light source. As the ring resonator gyroscope cavity rotates in inertial space, the two counterpropagating beams travel unequal path lengths. This path difference, due to rotation in inertial space, gives rise to a relative frequency difference (Sagnac effect[2]) between the two counterpropagating beams. (NOTE: A ring resonator, as opposed to a linear resonator, can exhibit the Sagnac effect and detect inertial rotation.)

The relative frequency difference is detected as an electrical beat signal which is then electronically interpreted to indicate the direction and inertial rate of rotation of the passive gyro about the gyro's sensitive axis. The sensitive axis of the gyro is along the direction normal to the plane of the passive resonator.

[2] E. J. Post, "Sagnac Effect", *Review of Modern Physics*, Vol. 39, No. 2, Apr. 1967, p. 475-493.

The single frequency light source for the passive resonator is typically an external linear laser. *Spectra Physics Inc.* of Sunnyvale, Calif. produces stabilized lasers with the required characteristics.

It is known that bias errors in the detected signal of a ring resonator gyro result from dimensional changes in the laser and in the passive ring resonator. Bias errors also result from Fresnel Drag; these errors arise from the presence of gases (e.g. air) in the path of the counterpropagating beams in the resonator. Bias errors are typically characterized as a frequency difference between the two beams which is not related to the rotation rate. Bias errors are sometimes detected as a frequency difference in the absence of rotation or as post calibration changes in the frequency difference for a specific absolute inertial rotation rate.

The Passive Ring Resonator Gyroscope of the type described in the EZEKIEL reference is typically constructed by placing optical elements, such as mirrors, beamsplitters, etc. on an optical bench. The location, spacing and geometrical relationships between the elements of the gyro function to enhance the passive ring resonator gyroscope's sensitivity and stability. Experimental passive ring resonator gyroscopes typically have path lengths of a few meters making them unsuitable for use as a navigational instrument. The large size of prior art passive ring resonator gyroscopes, such as that characterized in the EZEKIEL reference, also contributes to the likelihood of bias errors due to mechanical coupling and mechanical drift of the optical elements in response to physical and thermal forces acting on the laser and on the optical table or bench.

SUMMARY OF THE INVENTION

The objective of this invention is to provide a passive ring resonator gyro suitable for use as a navigational instrument having reduced bias errors and bias error sensitivity while having enhanced stability and sensitivity. This is accomplished by constructing a linear and ring resonator from one body in which the total resonator path length is substantially below a half meter.

Another objective of this invention is to provide a Passive Ring Laser Gyroscope using two frequency tracking servos for peaking the intensity of the CW (clockwise) and CCW (counterclockwise) propagating light beams in the passive cavity, eliminating the extra servo used in prior art systems to stabilize the first linear laser cavity.

A particular embodiment of this innovative passive ring resonator gyroscope has a single piece body, typically fabricated from a block of glass ceramic material such as ZERODUR [R], (a trademark of the JENA[ER] GLASSWERK SCHOTT & GEN. of MAINZ, GERMANY), which forms a fixed reference frame for all required optical elements, including the integral first and second resonator cavities. A laser means such as a linear or "L" shaped laser uses the first cavity, when operated with suitable excitation, functions as a linear laser providing a source of single mode $TEM_{oo}$, single frequency light for the second resonator cavity.

In a more particular alternative embodiment, the laser means, first resonator cavity has a transmitting optical ports for transmitting stabilized single frequency light. The internal body-mounted reflective surfaces are coupled to and mechanically spaced by the body. A gain medium, such as a Helium Neon gas mixture is contained in the first resonator cavity.

A means for exciting this gain medium to induce lasing in the first resonator cavity is provided. The single frequency light source is directed through at least one transmitting optical port of the first resonator.

The second resonator cavity and its reflective elements form a passive high Q cavity having a closed second optical path tuned to resonate at substantially the same frequency of the first resonator cavity. A means for coupling the single frequency light from the first to the second resonator cavity and for forming CW and CCW light beams in said second resonator is implemented using conventional mirrors, lenses and beamsplitters.

A significant feature of this passive ring resonator gyroscope is that the second resonator cavity is oriented and dimensioned in relation to the first resonator cavity to have substantially equivalent optical path length changes in response to any induced body dimensional changes. Furthermore, the fixed relationship of the linear laser and the passive ring resonator eliminates beam misalignment caused by the relative motion of the two resonators. Bias errors are diminished since the ring resonator is a passive device and has no internal excitation to frequency shift the cavity resonances. Bias errors due to axial gas flow is not a problem in the passive resonator. Bias errors are further diminished by the evacuation of the second resonator since there will be no effect due to Fresnel drag. Taken together, these features form a gyroscope with increased stability and reduced bias errors.

A cavity servo means is provided for controlling the resonant frequency of the first resonator high Q cavity to track the resonant frequency of the second resonator CW beam. A significant feature of this invention is that only two servo loops are needed since the first linear cavity frequency is locked to the CW resonance. The third servo loop required by prior art systems to stabilize and fix the frequency of the linear laser is eliminated.

The cavity servo means includes several elements such as a means responsive to the second resonator clockwise single frequency light beam for providing resonant clockwise beam optical excitation. The cavity servo means also includes a means responsive to the clockwise beam optical excitation for detecting the intensity of the second resonator clockwise beam and for providing a CW intensity control signal to characterize the intensity of the second resonator clockwise beam. In addition, a first servo amplifier means is included and is responsive to the clockwise intensity control signal for providing a first cavity path length control signal. The first servo means enables the first cavity to track the resonant frequency of the second resonator CW beam.

A first cavity path length adjusting means responsive to the first cavity path length control signal is provided to shift the resonant frequency of the first cavity. The first cavity path length adjusting means shifts the frequency of the first single frequency light source in response to the CW intensity control signal to maximize the intensity of the second resonator CW beam. Using this servo method, the servo normally used to stabilized the linear first cavity to its own intensity maximum is eliminated.

An output servo means is provided for shifting the frequency of the first cavity single frequency light as it enters the second resonator to form the CCW beam, to the intensity peak of the CCW beam in the second resonator in response to an input body rate about the sensitive axis of the gyro.

The output servo means further comprises a means responsive to the second resonator counterclockwise beam for providing resonant optical excitation. A means responsive to the counterclockwise optical excitation for detecting the intensity of the second resonator counterclockwise beam and for providing a CCW intensity control signal to characterize the intensity of the CCW beam is included along with an output servo amplifier means responsive to the CCW intensity control signal for shifting the frequency of the first cavity single frequency light source to peak the intensity of the second resonator CCW beam. The frequency of the single frequency light source before entering the second resonator to form the counterclockwise beam is constantly adjusted to compensate for effective path length changes due to body rate inputs to the passive ring resonator gyroscope sensitive axis and to peak the intensity of the CCW beam and to compensate for the effect of the first servo on the first cavity's resonant frequency.

In this more particular embodiment, a means for detecting the frequency difference between the clockwise and the counterclockwise beams provides a signal representing a measure of the input body rate.

DESCRIPTION OF THE PREFERRED EMBODIMENT

Figure 1:
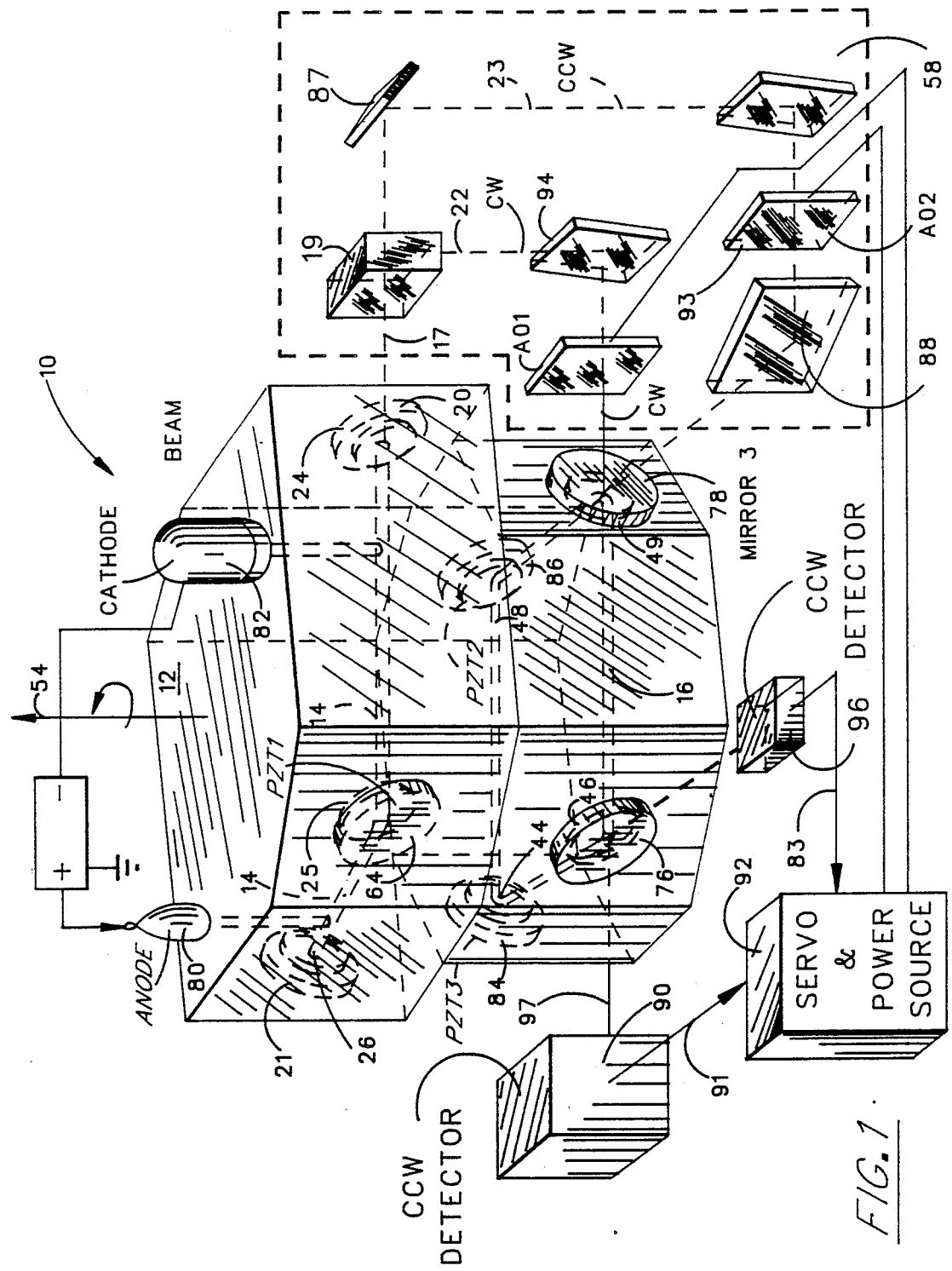
FIG. 1 is a prospective view of the passive ring resonator gyroscope.

Referring now to FIG. 1, an embodiment of the invention passive ring resonator gyroscope is depicted having a single piece body 12 having integral first and second resonator cavities 14, 16. The first cavity contains elements forming a standing wave "L" shaped laser, referred to as the linear laser. The output of the linear laser is not influenced by inertial rate inputs to the gyroscope.

The first resonator cavity 14 has a transmitting optical port means at transmissive port 20 for transmitting stabilized single frequency light as ray 17, and at least two internal body-mounted reflective surfaces such as partially transmissive mirrors 24, 26 and a mirror surface 25 on a piezoelectric transducer, such as PZT1 64. Each reflective surface is coupled to and mechanically spaced by the body 12.

An appropriate gain medium, such as a mixture of Helium and Neon, is contained in the first resonator cavity.

Block 28 represents a means for exciting the gain medium to induce lasing in the first resonator cavity. This element is typically a controllable current source capable of providing an output voltage capable of exceeding the ionization potential of the gas mixture and having an output current capability of one to ten milliamperes.

Referring again to FIG. 1, the single frequency light, represented by phantom line 17, is shown directed through the first resonator transmitting optical port means, such as partially transmissive mirrors 24 to beamsteering optics 58. Beamsteering optics 58 couples the single frequency light to the second resonator's clockwise beam entry at partially transmissive MIRROR 3, 78.

Referring to FIG. 1, the second cavity 16 is a ring resonator cavity depicted as having a receiving optical port means, such as MIRROR 78 for receiving stabilized single frequency light. The second resonator has at least three reflective surfaces such as those designated by reference numbers 44, 46, 48, 49, that form a closed optical path and enclosing an area. The passive ring resonator gyroscope sensitive axis 54 is normal to the plane of the enclosed area.

The FIG. 1 phantom block 58 represents a means for coupling the single frequency light source by optically deflecting the light to beamsteer the single frequency light as it exits the first resonator cavity transmitting port means 20 to the second resonator cavity receiving optical port means, such as MIRROR 78.

Beam splitter 19, and MIRRORS 87, 88 represent a means for beamsplitting and beamsteering. The single frequency light 17 exits the first resonator cavity transmitting port means at partially transmissive MIRROR 2 at 20 at frequency Fo. Beamsplitter 19 receives the stabilized single frequency light from 17 and divides the light Fo into the first and second single frequency light sources represented by rays 22 and 23 to the second resonator cavity receiving optical port means, such as partially transmissive MIRROR 3. MIRROR 3 represents a receiving optical port means for coupling the first and second single frequency light sources into the second resonator cavity to provide clockwise and counterclockwise beams respectively within said second resonator closed optical path 16.

Figure 6A:
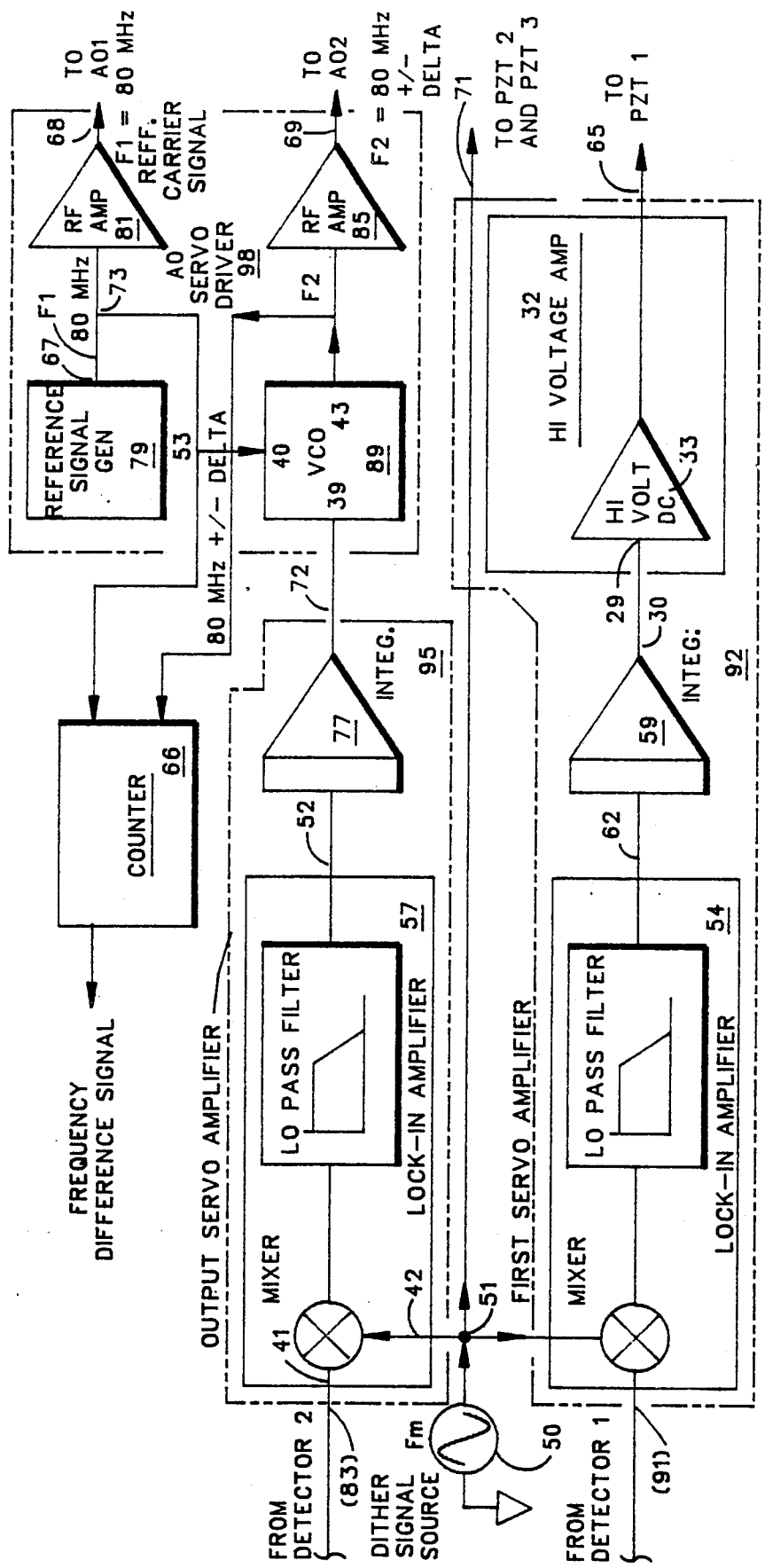
FIGS. 6A and 6B are a combination schematic and block diagram of the associated electronics and optical elements of the passive ring resonator gyroscope using two servo control loops.
Figure 6B:
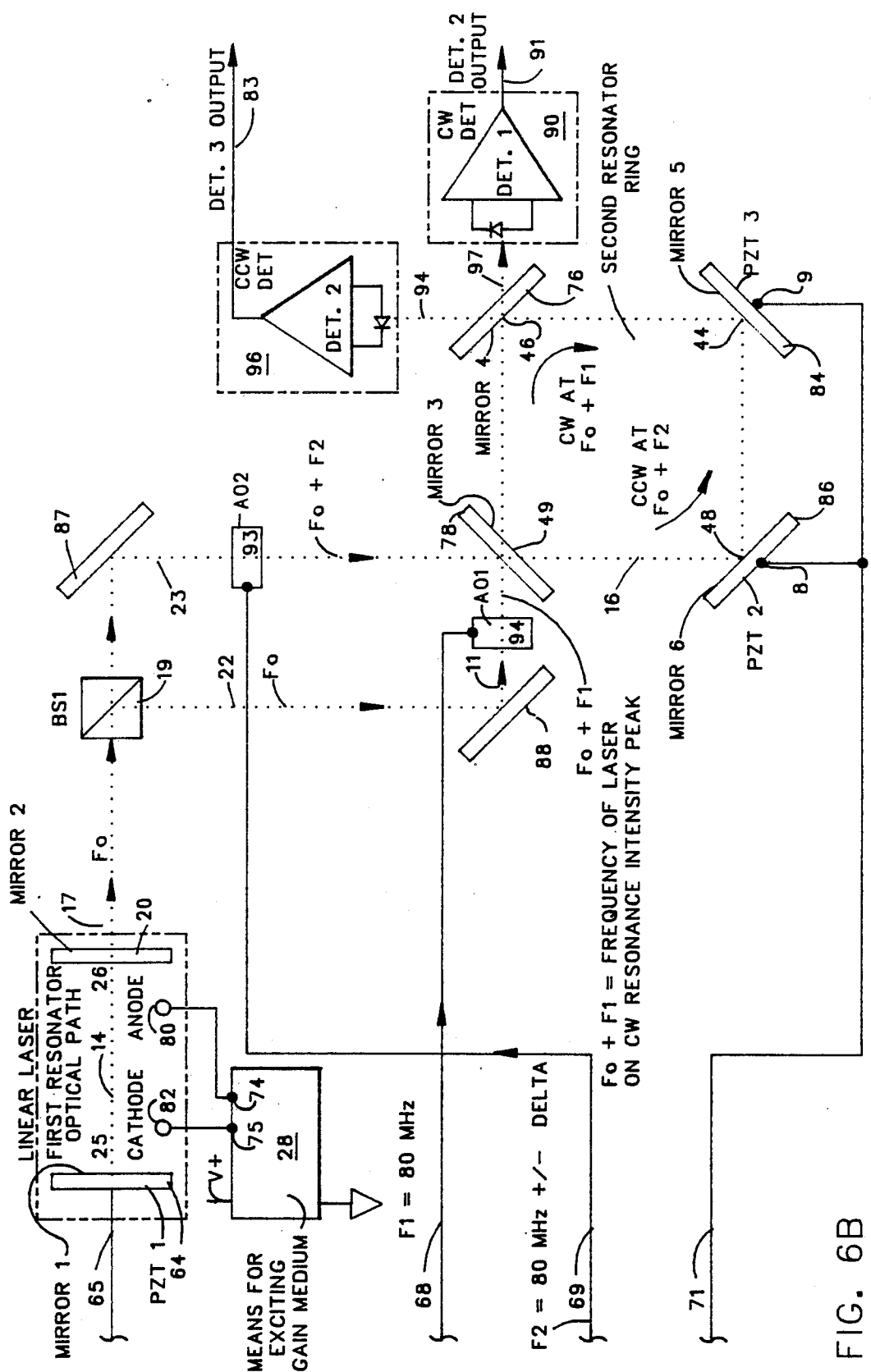

Referring to both FIG. 6A and 6B, the elements within phantom blocks 76, 90, 92, and PZT 1, 64 represent a cavity servo means responsive to the intensity of the clockwise beam for adjusting the path length of the first resonator cavity 14 between mirror surfaces 25 and 26 to maximize the intensity of light sensed by DET 1, 90 of the clockwise beam. The CW beam is frequency stabilized to its intensity peak. The phrase "frequency stabilization" is understood to mean phase sensitive detecting and is also meant to include the principle of servo locking the laser output to its intensity peak.

Elements within phantom blocks 76, 96, 95, 98 and 93 represent an output servo means responsive to the amplitude of the counterclockwise beam for adjusting the frequency of the counterclockwise beam by adjusting the second single frequency light source 23 to compensate for effective path length changes due to body rate inputs to the passing ring resonator gyroscope sensitive access. The output servo means operates to maximize the intensity of the counterclockwise beam.

The first and second resonator cavities induces output signal frequency bias error in response to body dimension changes, such as those induced by temperature changes. The second resonator cavity is positioned, i.e. in parallel alignment, and dimensioned in relation to the first resonator cavity to experience relatively equivalent optical path length changes in response to induced body dimension changes.

Referring to FIGS. 6A and 6B, the means for exciting the gain medium to induce lasing in the first resonator cavity to provide a stabilized single frequency light source further comprises elements within the LINEAR LASER such as anode 80, cathode 82, and current source means 28. Current source 28 has a current source terminal, such as 74 and a return terminal 75, for coupling a control current from the current source terminal 74 to the anode means 80, through the gain medium to induce lasing, to the cathode means 82 and thence to the current source return terminal 75.

The cavity servo means 90, 92 and 64 includes partially transmissive MIRROR 4, 76. MIRROR 4 functions as a means responsive to the second resonator clockwise single frequency light beam for providing clockwise beam 97 for optical excitation to DETECTOR 1, 90.

DETECTOR 1, 90 represents a means responsive to the clockwise beam optical excitation for detecting the intensity of the second resonator clockwise beam 97 and for providing a CW intensity control signal on signal line 91 to characterize the intensity of the second resonator clockwise beam 97.

Referring to FIG. 6A, phantom block 92 represents a first servo amplifier means responsive to the clockwise intensity control signal on line 91 for providing a first cavity path length control signal on line 65 to PZT 1, 64.

PZT 1, 64 is a piezoelectric transducer and functions as a first cavity path length adjusting means responsive to the first cavity path length control signal on signal line 65 for adjusting the first cavity optical path length between MIRRORS 25, 26 to maximize the intensity of the second resonator CW beam by shifting the frequency of the first cavity single frequency light source 17, such that the shifted frequency Fo+F1 corresponds to the frequency of maximum intensity of the second resonator CW beam.

Referring again to FIGS. 6A and 6B, the output servo means also comprises partially transmissive MIRROR 4, 76. The embodiment of FIG. 6B also uses MIRROR 4 as a means responsive to the second resonator counterclockwise beam 94 for providing optical excitation to DET 2, 96 at frequency Fo+F2.

DETECTOR 2, 96 represents a means responsive to the counterclockwise optical excitation for detecting the intensity of the second resonator counterclockwise beam 94 at frequency Fo+F2 and for providing a CCW intensity control signal on control line 83 to characterize the intensity of the CCW beam.

Phantom block 95, block 98 and AO2, 93 represents an output servo amplifier means responsive to the CCW intensity control signal from DETECTOR 2 on signal line 83 for shifting the frequency of the second single frequency light source 23 to frequency Fo+F2 at the intensity peak of the second resonator CCW beam.

AO SERVO DRIVER, 98 has a reference signal generator 79 to provide a reference carrier signal F1 at typically 80 MHz. A dither signal source is characterized in FIG. 6A by sinusoidal signal generator source 50. The sinusoid dither signal is supplied via signal line 71 to second resonator PZT 2, 86 and PZT 3, 84 to modulate the second resonator resonant frequency at a fixed low frequency, typically selected to be in the range of 100 to 1000 Hz. The Fm is provided as a reference to the FIRST SERVO AMPLIFIER input 51 and to the OUTPUT SERVO AMPLIFIER MEANS INPUT 42.

The AO SERVO DRIVER 98 modulates the first single frequency light source at ray 22 with the reference carrier signal F1 via AO1 94, to provide a reference carrier modulated clockwise beam at frequency Fo+F1. The cavity servo means 76, 90, 92, 64 is responsive to the intensity of the clockwise beam for adjusting the path length of said first resonator cavity 14 to maximize the intensity of the reference carrier modulated clockwise beam.

The output servo means 76, 96, 95, 98, 93 modulates the second single frequency light source at ray. 23 with a shifted reference carrier signal F2 to provide a shifted reference carrier modulated counterclockwise beam at frequency Fo+F2. The output servo means is responsive to the amplitude of the shifted reference carrier modulated counterclockwise beam for adjusting the frequency of the shifted reference carrier signal frequency to maximize the intensity of the shifted reference carrier modulated counterclockwise beam at frequency Fo+F2.

Counter 66 represents a means for detecting the frequency difference between the reference carrier F1 and the shifted reference carrier signal F2 in response to rotation of the single piece body about the sensitive axis and to provide a frequency difference signal of F1−F2 to serve as a measure and direction of the rotation rate of the body about its sensitive axis.

The first servo amplifier means 92 has a LOCK-IN amplifier means 54 having a first input coupled to the CW intensity control signal on signal from DETECTOR 1 on line 91, and a second input responsive to the dither signal at 51 from generator 50 for mixing and amplifying the CW intensity signal from line 91 with the dither signal from generator 50 and for providing a synchronously demodulated and amplified clockwise control signal on signal line 62.

The first servo amplifier means 92 also has an integrator means 59 having an input responsive to the amplified clockwise control signal on line 62 for providing an integrated error signal on line 30.

High voltage amplifier means 32 has an input 29 coupled to the integrated clockwise control signal for providing the first cavity path length control signal on signal line 65.

The first cavity path length adjusting means is represented by at least one electromechanical transducer such as PZT1 64 attached to reflective surface 25 positioned to adjust the first resonator optical path length between reflective surfaces 25 and 26 to maximize the second resonator clockwise beam intensity. PZT1 has an input terminal 7 coupled to receive the first cavity path length control signal on signal line 65.

The output servo amplifier means is characterized to modulate the CW beam with reference carrier signal at frequency F1. The output servo operates to continuously adjust the shifted reference carrier output frequency F2 in response to the CCW intensity control signal from DET 2 on signal line 83 by using synchronous detection in response to a dither signal source such as the output from oscillator source 50.

In an alternative embodiment, the output servo amplifier means 95 is responsive to the CCW intensity control signal. It has a LOCK-IN amplifier means 57 having a first input coupled to the intensity control signal on signal line 41, and second input responsive to the dither signal one line 42 for providing a synchronously demodulated amplified frequency control signal on control line 52.

Integrator means 77 has an input responsive to the synchronously demodulated amplified frequency control signal for providing an integrated frequency control signal on signal line 72.

AO servo driver means 98 is included and has a first input 72 coupled to the integrated frequency control signal. The AO servo driver has a reference signal generator 79 that provides a predetermined reference frequency signal F1 of typically 80 MHz.

The voltage controlled oscillator 89 is also included and has a center frequency established by the predetermined reference frequency signal F1 typically centered at 80 MHz. The voltage controlled oscillator (VCO) 89 has an input 39 responsive to the integrated frequency control signal on line 72 for providing a shifted reference carrier frequency signal F2. The frequency of this signal is shifted from the reference carrier frequency by a difference characterized by the integrated frequency control signal.

A first RF amplifier means is represented by triangle 81. This RF AMP is responsive to the reference carrier signal for providing a clockwise carrier drive signal on signal line 68 that has a frequency equal to the reference carrier frequency signal frequency. This amplifier has a signal input coupled to the output 67 of the SIGNAL GEN 79.

A second RF amplifier means is represented by triangle 85. This RF AMP is responsive to the shifted carrier reference signal F2 for providing a counterclockwise carrier drive signal.

This amplifier has a signal input coupled to the output of the VCO 89 at VCO output 43. The second RF amplifier 85 is responsive to the counterclockwise carrier frequency signal for providing a counterclockwise carrier drive signal at frequency F2.

A first acousto-optic coupler AO1, 94 is responsive to the clockwise carrier drive signal on signal line 68 for modulating the frequency of the first single frequency light source 22 at a frequency equal to the reference carrier signal frequency F1.

A second acousto-optic coupler AO2, 93 is responsive to the counterclockwise carrier drive signal on signal line 69 for modulating the frequency of the second single frequency light source 23 at the frequency of the shifted carrier reference signal frequency F2.

Counter means 66 is responsive to the reference carrier signal F1 and the shifted carrier reference signal F2 for providing a gyro body rate output signal proportional to the difference F1−F2. The frequency difference signal is processed and scaled to provide a signal characterizing the rotational body rate about the gyro sensitive axis.

In a preferred alternative embodiments of the passive ring resonator gyroscope, the Free Spectral Range of the first resonator cavity is adjusted to be equal to the Free Spectral Range of the second resonator cavity.

Figure 7:
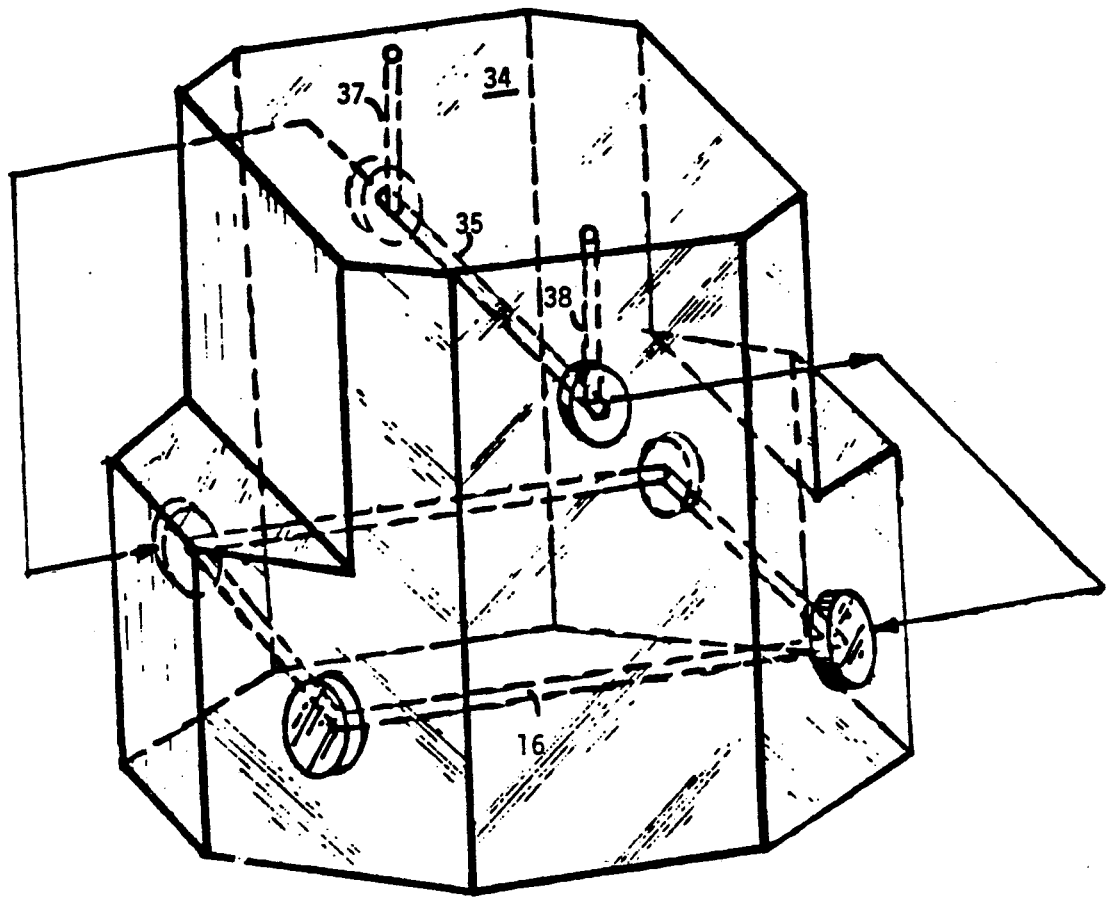
FIG. 7 is a schematic diagram of an alternative passive ring resonator gyroscope housing showing the use and positioning of a straight linear laser.

The use of an L-shaped laser as the first resonator cavity above the passive resonator appears to offer the best promise for dimensional compensation. However, FIG. 7 shows a simpler embodiment using a first resonator cavity characterized to form a straight linear laser. The second resonator cavity 16 is characterized as being positioned and dimensioned relative to the first resonator cavity to experience relatively equivalent optical path length changes along one axis in response to the induced body dimension changes.

Bias errors relating to temperature induced body dimension changes or to changes from external body forces, such as those transmitted to the body 12 via shock mounts, are cancelled thereby providing enhanced stability.

In another more particular alternative embodiment of the passive ring resonator gyroscope, the means for exciting the gain medium to induce lasing in the first resonator cavity to provide a stabilized single frequency light source further comprises at least one anode, such as anode 80, at least one cathode, such as cathode 82, and a current source means block 28, such as that shown in FIG. 6B. Block 28 is powered from a voltage source such as V+ with respect to a reference potential such as ground, having a current source terminal 74 and a return terminal 75 for coupling a controlled current from the current source terminal 74 to the anode means 80, through the gain medium (not shown) to induce lasing, to the cathode means 82 and thence to the current source return terminal 75. In a typical Helium-Neon laser, it is customary to reference the anode to a potential at or near ground and to drive the cathode from a high negative potential source.

FIGS. 6A and 6B, show a block diagram of an alternative embodiment of the passive ring resonator gyroscope in which the first resonator tuning means has a means responsive to the single frequency light for providing optical excitation, such as partially transmissive MIRROR 2, 20 and BEAMSPLITTER BS1, 19 and mirror 87. The current source means 28, and the first resonator optical path 14 between mirrored surfaces 25 and 26, and a gain medium (not shown) such as a mixture of Helium and Neon gas resides within the sealed first resonator 14 and functions to provide the single frequency light source to partially transmitting MIRROR 2, 20. Beamsplitter BS1, 19 provides the optical excitation from the linear laser as ray 22 at frequency Fo to form the CW beam in the second cavity exiting at MIRROR 4, 76 to be incident on Detector 1, 90.

DETECTOR 1, 90, operating with the first servo amplifier 92, represents a cavity servo amplifier means responsive to the clockwise beam optical excitation for detecting the intensity of the second resonator clockwise beam and for providing an optical path length control signal to 92 on control line 91 to maximize the intensity of the second resonator clockwise beam. By the phrase "detecting the intensity of the second resonator clockwise beam", we also mean to include the concept of positioning the DETECTOR and characterizing the control means to be responsive to a reflected intensity minimum. In the present embodiment, DETECTOR 1 and 2 are responsive to an intensity maximum.

Optical detector units (such as DETECTOR 1, 2, 90 and 96) typically contain a reversed biased PIN diode and a low noise preamplifier. A detector such as the SD-00-12-12-231 manufactured by the *Silicon Detector Corp.* of Newbury Park, Calif. is suitable for use with a Helium Neon laser light source.

DETECTOR 2, 96, OUTPUT SERVO AMPLIFIER 95 and AO SERVO DRIVER 98 represent a means responsive to the counterclockwise optical excitation for detecting the intensity of the second resonator counterclockwise beam and for providing a counterclockwise frequency control signal on control line 69 to AO2 to adjust the frequency of the second CCW single frequency light source.

The elements within OUTPUT SERVO AMPLIFIER, PHANTOM BLOCK 95 and AO SERVO DRIVER, PHANTOM BLOCK 98 represent an output servo amplifier means responsive to the counterclockwise frequency control signal for adjusting the frequency of the counterclockwise beam to maximize the intensity of the counterclockwise beam. The frequency of the counterclockwise beam is constantly adjusted by AO2 93 in response to the frequency control signal on line 69 to compensate for effective path length changes due to body rate inputs about the passive ring resonator gyroscope sensitive axis 54.

In another more particular alternative embodiment of the passive ring resonator gyroscope, the cavity servo amplifier means responsive to the optical path length control signal from DETECTOR 1 has a LOCK-IN amplifier means represented by LOCK-IN AMPLIFIER 54 having a first input coupled to the clockwise intensity control signal from DETECTOR 1 on control line 91, a second input responsive to the dither signal at terminal 51 for mixing and amplifying the clockwise intensity control signal with the dither signal and for providing an amplified clockwise control signal.

Integrator means represented by INTEGRATOR 59 has an input responsive to the amplified clockwise control signal for providing an integrated clockwise control signal.

A high voltage amplifier means to drive the electromechanical transducer is represented by the HI VOLT DC element 33 within phantom block 32. The HI VOLT DC amplifier has input 29 coupled to the integrated clockwise control signal on signal line 30 to provide a buffered output control voltage on signal line 65 referred to as the first cavity pathlength control signal.

The cavity servo amplifier means also includes at least one electromechanical transducer such as PZT2 86 and PZT3 84 mounted behind a reflective surface such as 48 and 44. The PZT's are used to modulate the second resonator optical path length 16 at the dither frequency Fm. Input terminals 8, 9 are coupled to receive the dither signals on signal line 71 from dither signal source 50.

Several reference frequencies are defined in FIG. 6B. By the symbol Fo, we mean the operating frequency of the linear laser which, when added to the reference carrier signal frequency, provides a light source at the CW intensity peak. By F1 we mean the frequency that AO1 is driven at to modulate the frequency of the clockwise beam at the frequency of the reference carrier signal. The clockwise beam has a frequency of Fo+F1 and is at CW peak resonance. By F2 we mean the frequency that AO2 is driven at to modulate the frequency of the counterclockwise beam at the frequency of the shifted reference carrier signal to achieve peak CCW resonance. The CCW beam has a frequency of Fo+F2.

A voltage controlled oscillator (VCO) 89 is shown to be phase-locked to reference carrier signal F1 through input 40. The VCO has a center frequency at the reference frequency F1 (typically 80 MHz). The frequency selected for actual use will depend on the AO devices selected for use.

The voltage controlled oscillator input 39 is responsive to the integrated frequency control signal and provides a counterclockwise frequency signal at output terminal 43 at frequency F2. The frequency difference between F1 and F2 is characterized by the integrated frequency error signal input at 39.

A first RF amplifier means represented by RF AMP 81 is responsive to the reference carrier signal F1 for providing a clockwise carrier drive signal at terminal 68. A second RF amplifier means represented by RF AMP 85 is responsive to the shifted reference carrier signal F2 for providing a counterclockwise carrier drive signal at terminal 69. A first acousto-optic modulator AO1, 94 is shown on FIG. 6B responsive to the clockwise carrier drive signal for shifting the frequency of the linear laser Fo to adjust the Fo+F1 frequency to equal the CW resonance intensity peak.

A second acousto-optic coupler AO2, 93 is responsive to the counterclockwise carrier drive signal on control line 69 to shift the frequency of the linear laser to Fo+F2.

A counter means 66 phased locked to the reference clock through 53 is provided to measure F2 and compare its value with the reference frequency F1 to determine the inertial rotation rate.

Each of the LOCK-IN AMPLIFIERS depicted in FIG. 6A functions to mix a dither signal, such as Fm, typically near 1kHz, with a DETECTOR output signal that contains information at Fm. Using this synchronous demodulation or phase sensitive detection technique, control information is obtained in high noise environments. Amplifiers of this type are sensitive to the phase relationship between the input information signal and the reference or dither signal to the lock-in amplifier. An in-phase information signal will provide an output response of one polarity and an out-of-phase relationship will result in an output signal of an opposite polarity. A typical LOCK-IN AMPLIFIER is the *PRINCETON APPLIED RESEARCH* Model 124A manufactured at Princeton, N.J. Amplifiers of this type, typically high Q DC amplifiers, provide a gain of several thousand at the reference or dither frequency and have virtually no gain at other frequencies above or below the reference frequency. For an information signal of a fixed level at the reference frequency, the amplifier typically provides a fixed DC level response at its output.

The output of the LOCK-IN AMPLIFIER 57, i.e. the amplitude frequency control signal 52, is fed to the input of INTEGRATOR 77. The output 72 of INTEGRATOR 77 provides an integrated frequency control signal that is coupled to an input of the AO SERVO DRIVER 98. The INTEGRATOR 77 responds by integrating the output of the lock-in amplifier. A constant level out of the LOCK-IN AMPLIFIER will typically result in a constantly increasing or decreasing output from the integrator. The output servo control loop is characterized to respond by driving the AO2 device as required to peak the CCW beam intensity at Fo+F2 and to drive the information signal at Fm from DETECTOR 2 to zero.

The AO SERVO DRIVER 98 has RF AMP 81 and 85 with gains centered around F1. These amplifiers are characterized to typically operate at 80 MHz and to provide the required power level (typically 1 to 2 Watts) to AO1 and AO2 on control lines 68 and 69, respectively. SIGNAL GEN 79 provides a reference carrier output signal at output 67 on signal line 73 at frequency F1 (typically 80 MHz) to RF AMP 81. Phase-lock operation requires that counter 66, VCO 89, and the output of RF AMP 81 all be referenced to the output of frequency of SIGNAL GEN 79 at 67. Arrangements using a master clock at typically 10 MHz (not shown) with appropriate multiplication and/or divide circuits to phase-lock the VCO and counter are anticipated. The VCO output 43 at F2 is coupled to the input of RF AMP 85 and to the input of COUNTER 66.

The VCO is characterized in this configuration to operate with a center frequency of F1. The VCO output varies in frequency by +/− DELTA as a function of its scale factor and the level of the analog integrated frequency control signal 72 from INTEGRATOR 77. DELTA is the variation in frequency of F2 from F1 and is the amount by which the CW frequency Fo+F1 and the CCW frequency at Fo+F2 must be shifted up or down in frequency to their corresponding peak resonance in the passive cavity. DELTA is counted by Counter 66 and is a measure of the body input rate about the gyro's sensitive axis.

The cavity servo means has FIRST SERVO AMPLIFIER 92 which has LOCK-IN AMPLIFIER 54, INTEGRATOR 59 and HI VOLT AMP 32. LOCK-IN AMPLIFIER 54 has a first input coupled to the output of DETECTOR 1 via control line 91 and a second input coupled to receive the output of the Fm dither oscillator from terminal 51. The operation of this LOCK-IN is essentially equivalent to that of LOCK-IN AMPLIFIER 57 discussed above. The output 62 of LOCK-IN AMPLIFIER 54, the amplified clockwise control signal, is coupled to the input of INTEGRATOR 59. The output of INTEGRATOR 59, the integrated clockwise control signal 30, is coupled to input 29 of HI VOLT AMP 32. The HI VOLT AMP 32 has a HI VOLTAGE DC AMPLIFIER 33 capable of providing an output voltage of over 100 V needed to drive the PZT1. The signal to PZT1 is the first cavity pathlength control signal. It is a slowly varying control signal as a result of INTEGRATOR 59.

PZT2 and PZT3 86, 84 shown in FIG. 6B represent piezoelectric transducers. PZT2 and PZT3 each function as an electromechanical transducer, attached to reflective surfaces 48, 44 so as to modulate the second resonator optical path length at the dither frequency Fm. Each PZT has an input terminal 8, 9 coupled via signal line 71 to the dither signal source 50.

In alternative embodiments of this type, shown in FIG. 1, the first resonator cavity is characterized to form a straight or "L-shaped" or "U-shaped" linear laser. The manufacturability of the invention gyroscope is increased by the use of a straight linear laser as shown in FIG. 7.

Figure 2:
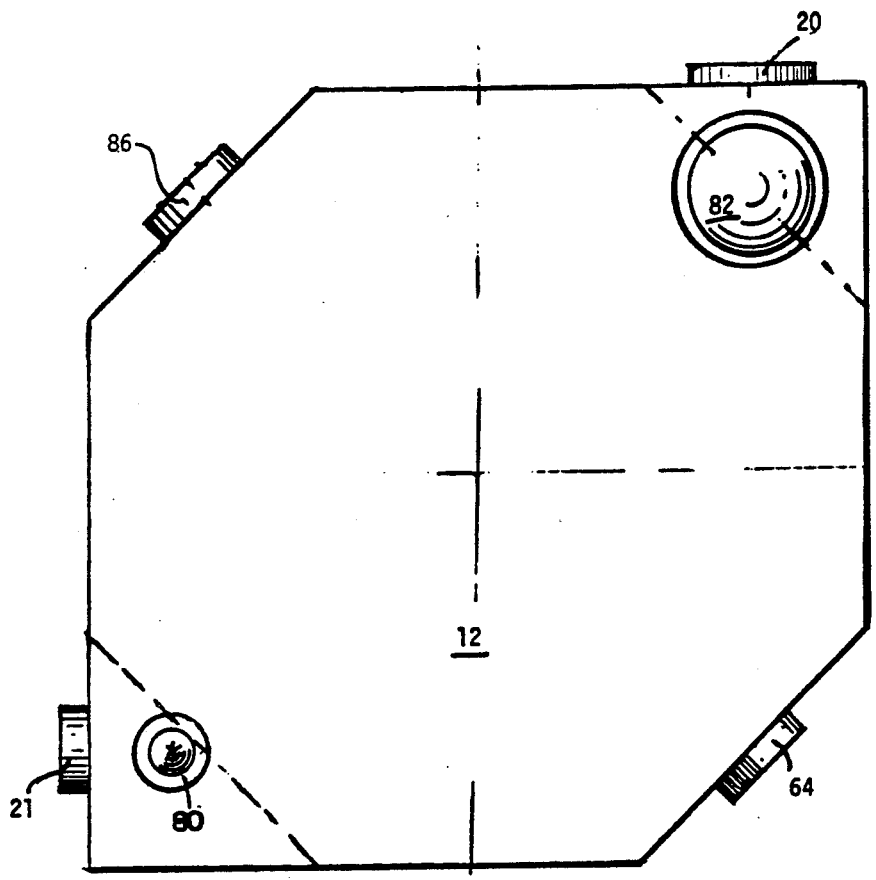
FIG. 2 is a top planar view of the passive ring resonator gyroscope body.

FIG. 2 is a top view of a preferred embodiment single piece body 12 showing partially transmissive mirror 20, mirror 21 and PZT1, 64. Single frequency light passes through mirror 20 and is redirected by beamsteering optics to the second passive cavity 16 (not shown). PZT1, 64 is a piezoelectric transducer having a mirrored surface at the corner of the first resonator cavity 14 for circulating light through the gain bore within the first resonator 14 (of FIG. 4 and FIG. 1).

Figure 3:
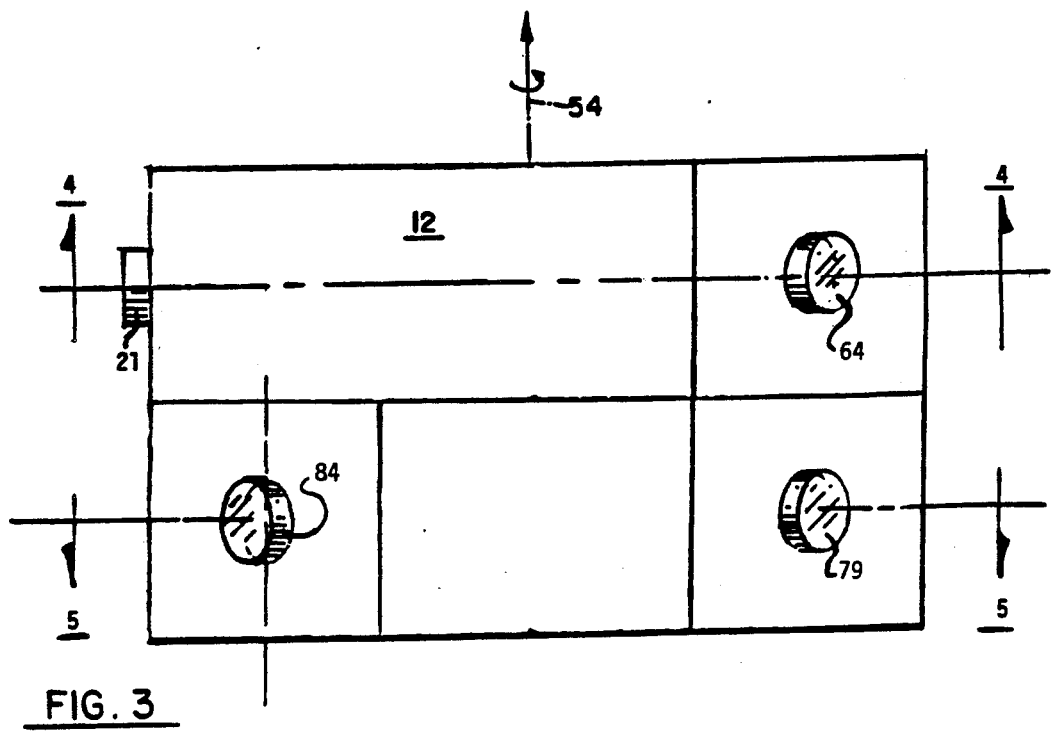
FIG. 3 is a front view of the passive ring resonator gyroscope body.

FIG. 3 shows PZT1, 64 on the surface of the passive ring resonator gyroscope body 10. Section lines 4—4 and 5—5 show the section line locations for FIGS. 4 and 5, respectively.

Figure 4:
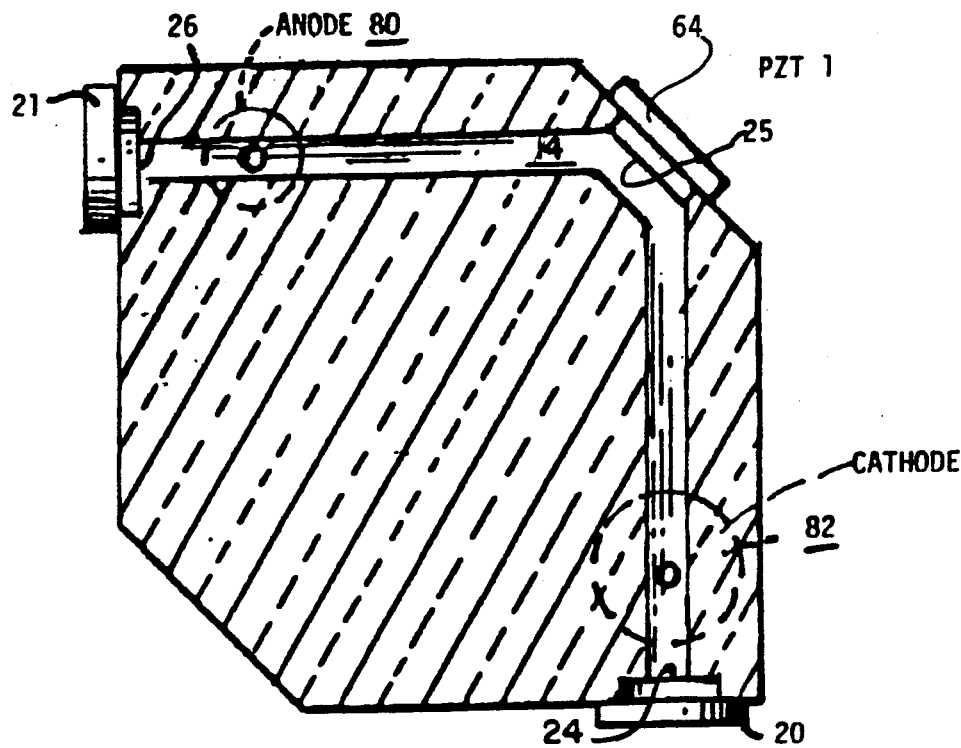
FIG. 4 is a sectional view of the passive ring resonator gyroscope body taken along sectional line 4—4.

FIG. 4 shows a sectioned view of the first resonator cavity 16 viewed from the bottom looking up.

Figure 5:
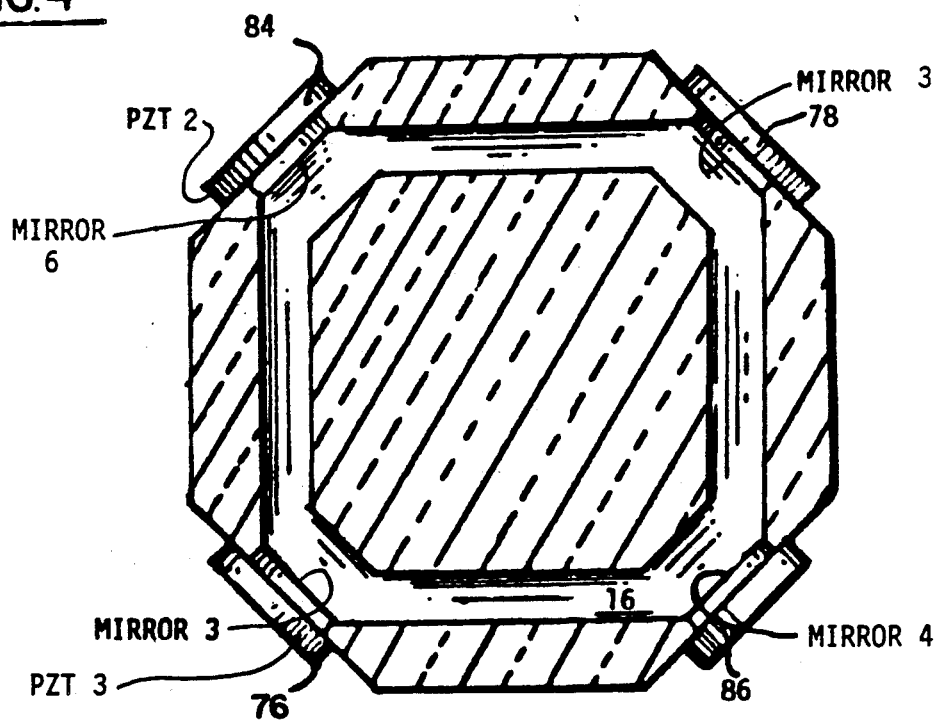
FIG. 5 is a sectional view of the passive ring resonator gyroscope body taken along line 5—5.

FIG. 5 shows a sectional view of the second resonator cavity viewed from the top looking down. The L-shape of the first resonator cavity in FIG. 4 is dimensioned and positioned in this embodiment to reside directly above the second resonator cavity of FIG. 5 and and to be essentially congruent with one half of the second resonator cavity and therefore experiences relatively equivalent optical path length changes in response to induced body dimension changes such as those resulting from mechanical forces applied to the body or to those resulting from thermally induced strain.

FIG. 7 represents another alternative embodiment of a body 34 for use in fabricating a more produceable passive ring resonator gyroscope. The configuration of body 34 includes a first cavity 35 for use as the gain bore for a linear laser. Vent holes 37 and 38 lead to anode and cathode locations on the top surface of the body 34.

The frequency of the free running linear laser 17 typically varies over a few MHz (megahertz). In this invention, intensity stabilization control means is expected to provide operation with a stability of a few hundred kilohertz.

The DETECTOR 1, 90 block is selected to have high gain and low noise. A slow dither or modulation frequency Fm is superimposed on top of the CW resonance frequency Fo+F1. The optical feedback signal from DETECTOR 1, 90 is demodulated by mixing it with the reference Fm in the LOCK-IN amplifier. By choosing a suitable Fm, the LOCK-IN output will be a discriminator curve proportional to the slope of the gain curve or resonance signal. This discriminator curve is integrated to provide the compensating feedback- +or−error control voltage to PZT1. The PZT changes the length of the cavity to maximize the output such that the detector output is zero and the cavity is locked on the top of the gain curve. This concept of frequency stabilization using frequency modulation and phase sensitive detection is used in the linear laser servo and in the cavity servo loops.

OPERATION

Due to the Sagnac effect, the path lengths of the clockwise (CW) and counterclockwise (CCW) beams in ring resonator differ as a function of body rotation rates. Consequently, the resonant frequencies for CW and CCW light in the passive cavity have a corresponding difference dependence. See Reference 2 on page 3 of this document. The goal of the optics and electronics of the Passive Ring Resonator Gyroscope (PRRG) is to detect the frequency difference that arises between the CW and CCW beams due to inertial rotations. The intent of the single body linear laser/passive cavity design is to eliminate bias errors caused by the resonant frequencies of the linear laser and passive cavity changing with respect to one another. In this single block, these bias errors will also be independent of input rotation rates. The two cavities are arranged mechanically and geometrically to insure that shifts in laser frequency arising from body dimensional changes are experienced by both the passive resonator cavity and the linear laser cavity and therefore reduce the effect of such bias errors.

To obtain such bias compensation, the Free Spectral Range of the first resonant cavity 14 is made equal to the Free Spectral Range of the second resonant cavity 16. The Free Spectral Range (F.S.R.)=c/p where c is the speed of light and p is the optical round trip pathlength of a resonator. Thus, the F.S.R. of a square passive ring resonator with sides of length L is c/4L. To meet the F.S.R. requirement, two cases arise contingent upon the linear resonator design. If the first resonator forming the linear laser is comprised of a mirror with no curvature, i.e. a flat mirror, and a mirror with a predetermined radius of curvature, i.e. a curved mirror, the required resonator length between mirrors is L. The F.S.R. of this flat mirror, curved mirror resonator equals c/4L. However, a resonating using two curved mirrors requires a resonator length between mirrors equal to 2L. This configuration also has a F.S.R. equaling c/4L. With the criteria (F.S.R.)$_{Laser}$=(F.S.R.)$_{Passive Resonator}$=c/4L, it is apparent that any change in the F.S.R. of the laser resonator will equal any change in the F.S.R. of the passive ring resonator which may arise from thermal or mechanical changes.

Mirrors with piezoelectric (PZT) backings supply a modulation means to the passive resonator cavity; this modulation effects both the CW and CCW beams. This modulation or dither frequency Fm is a sinusoid typically 1 kHz.

Light leaving the passive cavity from the CW direction is detected and phase sensitive demodulated by employing a lock-in amplifier. The error signal drives a piezoelectric mirror in the linear laser to bring it into the CW beam's resonance. In the preferred embodiment, the DC error signal is applied to PZT1. The modulation signal Fm is applied to PZT2 and PZT3. The bandwidth of the gyroscope is limited by the bandwidth of PZTs used in this system. The unique property of this configuration is that only two servo loops are needed. The servo loop used in prior art control systems to frequency stabilize the first cavity source laser to its intensity gain peak is eliminated. The first cavity's frequency output is second cavity's CW resonance peak using one servo loop. The need for two different modulation frequencies, Fm and the need for summing high voltage DC amplifiers are eliminated. The single Fm reference signal is applied to the second cavity's PZTs and the DC error voltage is applied to the first cavity's PZT1. The first servo forces the first cavity to track the CW resonance while the second output servo tracks the CCW resonance at all times including intervals when body rate inputs are changing and thereby, changing the path lengths of the CW and CCW beams.

Acousto-Optics

Each of two single frequency light sources encounters a non-linear optical device which shifts the frequency of the input light. The AO devices are typically made up of a piezoelectric transducer attached to a crystal. The AO device is fabricated from a piezoelectric crystal material such as quartz, TeO$_2$ (Telurium Dioxide) or PbMoO$_4$ (Lead Molybdate). In the preferred embodiment, the transducer, driven at F1, establishes an acoustic wave F1 in the crystal. Associated with the acoustic wave is a varying index of refraction due to the compressions and rarefactions of atomic density in the crystal. Incoming light diffracts off this induced grating giving rise to many orders of diffracted beams. The 0th order beam is at the frequency of the single frequency light, Fo. The first order beam has the frequency Fo+Fs, where Fs is the frequency of the acoustic wave. The output from the AO device has the discrete frequencies Fo+nFs where n=0,1,2 . . . each separated in space by an angle proportioned to n. Thus, we see that by shifting the AO wave frequency by 1 Hz, we can add 1 Hz to the frequency of the first order beam exiting the AO device. (See e.g., *Optical Waves in Crystals*, A. Yariv & P. Yeh (John Wiley & Sons)

AO Servo

The acousto-optic device is an essential element in the output servo loop. CCW light is detected and phase sensitive demodulated producing a dc error signal. A voltage controlled oscillator (VCO) receives this error signal and outputs a sinusoid whose frequency is related to the input rotation rate. Specifically, the output servo alters the frequency of the light supplied to the CCW beam path via an A02 bringing that light into the CCW resonance. The output of the VCO and the reference carrier frequency is compared in a separate counter to determine the rotation rate of the gyro about its sensitive axis.

Common Mode

Two acousto-optic devices are used so each beam encounters similar phase shifts. A02 is driven by the VCO and shifts the CCW light to Fo+F2 where F2 displaced from F1 by an amount related to the input rotation rate. AO1 is in the CW beam path. It is driven by the signal generator which shifts the CW light to Fo+F1. By passing the CW light through an acousto-optic device, common mode bias errors are eliminated with respect to the CCW beam.

Although the invention has been disclosed and illustrated in detail, it is to be clearly understood that the same is by way of illustration as an example only and is not to be taken by way of limitation. The spirit and scope of this invention is to be limited only by the terms of the appended claims.

What is claimed is:

1. A passive ring resonator gyroscope having enhanced stability and sensitivity and having:
    a dither signal means for providing a dither signal; and
    a reference signal generator for providing a reference carrier signal; and
    a sensitive axis responsive to an input body rate comprising:
        a single piece body having an integral first and second resonator cavity;
        a laser means using said first resonator cavity for providing a single frequency light source to said second resonator cavity;
        said second resonator cavity being a passive high Q evacuated cavity having a closed optical path tuned to resonate at substantially the light frequency of said first resonator cavity, said sensitive axis being essentially normal to the plane of said closed second optical path;
        means responsive to said single frequency light source for coupling said single frequency light from said first to said second resonator cavity, for splitting said single frequency light into first and second single frequency light sources to provide respective CW and CCW light beams in said second resonator,
        said second resonator cavity being positioned and dimensioned in relation to said first resonator cavity to provide partial dimensional change compensation for optical path length changes in response to said induced body dimension changes;
    cavity servo means having a servo responsive to said dither signal and for controlling the resonant frequency of said single frequency light source first resonator high Q cavity to peak the intensity of said second resonator CW beam,
    output servo means responsive to the dither signal for adjusting the frequency of said second single frequency light source to shift the frequency of said CCW beam to peak the intensity of said CCW beam,
    frequency difference measuring means responsive to said CW and CCW beams for providing a signal characterizing the frequency difference between said second resonator CW and CCW beams;
    whereby, bias errors relating to temperature induced body dimension changes or to changes from external forces applied to said body are cancelled providing a passive ring resonator gyroscope having enhanced stability using only two servos.

2. The passive ring resonator gyroscope of claim 1 wherein said first resonator cavity further comprises:
    at least one transmitting optical port for transmitting stabilized single frequency light, said first resonator internal body-mounted reflective surfaces being coupled to and mechanically spaced by said body,
    a gain medium contained in said first resonator cavity;
    means for exciting said gain medium to induce lasing in said first resonator cavity to provide a stabilized single frequency light source, said single frequency light source being directed through said first resonator transmitting optical port.

3. The passive ring resonator gyroscope of claim 1 wherein said cavity servo means further comprises:
    means responsive to said second resonator clockwise single frequency light beam for providing clockwise beam optical excitation;
    means responsive to said clockwise beam optical excitation for detecting the intensity of said second resonator clockwise beam and for providing a CW intensity control signal to characterize the intensity of said second resonator clockwise beam;
    first servo amplifier means responsive to said clockwise intensity control signal for providing a first cavity path length control signal; and
    a first cavity path length adjusting means responsive to said first cavity path length control signal for adjusting said first cavity optical path length to shift the frequency of said second resonator CW beam by shifting the frequency of said first single frequency light source to maximize the intensity of said second resonator CW beam; and wherein said output servo means further comprises:
        means responsive to said second resonator counterclockwise beam for providing optical excitation;
        means responsive to said counterclockwise optical excitation for detecting the intensity of said second resonator counterclockwise beam and for providing a CCW intensity control signal to characterize the intensity of said CCW beam;
    output servo amplifier means responsive said CCW intensity control signal for shifting the frequency of said second single frequency light source to peak the intensity of said second resonator CCW beam;
    whereby, the frequency of the clockwise and counterclockwise beams are constantly adjusted to compensate for effective path length changes due to body rate inputs to said passive ring resonator gyroscope sensitive axis.

4. A passive ring resonator gyroscope 10 having enhanced stability and sensitivity comprising:
    a single piece body having an integral first and second resonator cavity;
    said first resonator cavity 14 having a transmitting optical port means for transmitting stabilized single frequency light, and at least two internal body-mounted reflective surfaces each reflective surface being coupled to and mechanically spaced by said body, a gain medium contained in said first resonator cavity;

means for exciting said gain medium to induce lasing in said first resonator cavity to provide said stabilized single frequency light source, said single frequency light source being directed through said first resonator transmitting optical port means out of said first resonator;

a dither signal means for providing a dither signal and for modulating the optical path length of said second cavity at dither signal frequency;

a reference signal generator for providing a reference carrier signal;

said second resonator cavity being evacuated and having:

a receiving optical port means for receiving stabilized single frequency light; said second resonator having at least three reflective surfaces forming a closed optical path, said closed optical path enclosing an area, said passive ring resonator gyroscope sensitive axis being normal to the plane of said area;

means for beamsteering said single frequency light exiting said first resonator cavity transmitting port means and for providing first and second single frequency light sources to said second resonator cavity receiving optical port means;

said means for beamsteering coupling said first and second single frequency light sources into said second resonator cavity to provide clockwise and counterclockwise beams respectively within said second resonator closed optical path;

cavity servo means having a single servo responsive to the intensity of said clockwise beam for adjusting the path length of said first resonator cavity to maximize the intensity of said clockwise beam, and output servo means responsive to the amplitude of said counterclockwise beam for adjusting the frequency of said counterclockwise beam to maximize the intensity of said counterclockwise beam;

said first and second resonator cavities inducing output signal frequency bias error in response to body dimension changes;

said second resonator cavity being positioned and dimensioned in relation to said first resonator cavity to experience relatively equivalent optical path length changes in response to induced body dimension changes;

means for detecting a shift in frequency of said counterclockwise beam with respect to said clockwise beam within said second resonator in response to rotation of said single piece body on said sensitive axis and to provide a gyro body output rate signal;

whereby, bias errors relating to temperature induced body dimension changes or to changes from external forces applied to said body are dimensioned.

5. The passive ring resonator gyroscope of claim 4 wherein said means for exciting said gain medium to induce lasing in said first resonator cavity to provide a stabilized single frequency light source further comprises:

at least one anode, at least one cathode, and current source means having a current source terminal and a return terminal for coupling a control current from said current source terminal to said anode means, through said gain medium to induce lasing, to said cathode means and thence to said current source return terminal.

6. The passive ring resonator gyroscope of claim 4 wherein said output servo means is further characterized to modulate said CW beam with said reference carrier signal; and output servo means is further said characterized to modulate said CCW beam at a shifted reference carrier signal frequency, said output servo operating to continuously adjust the shifted reference carrier output frequency to peak the intensity of said CCW beam.

7. The passive ring resonator gyroscope of claim 6 wherein said cavity servo means further comprises:

means responsive to said second resonator clockwise single frequency light beam for providing clockwise beam optical excitation;

means responsive to said clockwise beam optical excitation for detecting the intensity of said second resonator reference carrier modulated clockwise beam and for providing a CW intensity control signal to characterize the intensity of said second resonator clockwise beam;

first servo amplifier means responsive to said dither signal for providing a first cavity path length control signal; and a first cavity path length adjusting means responsive to said first cavity path length control signal for adjusting said first cavity optical path length to shift the frequency of said second resonator reference carrier modulated CW beam by shifting the frequency of said first single frequency light source to maximize the intensity of said second resonator reference carrier modulated CW beam.

8. The passive ring resonator gyroscope of claim 4 wherein said output servo means further comprises:

means responsive to said second resonator counterclockwise beam for providing optical excitation;

means responsive to said counterclockwise optical excitation for detecting the intensity of said second resonator shifted reference carrier modulated counterclockwise beam and for providing a CCW intensity control signal to characterize the intensity of said CCW beam;

output servo amplifier means responsive to said dither signal and said CCW intensity control signal for shifting the frequency of said second single frequency light source to peak the intensity of said second resonator shifted reference carrier modulated CCW beam;

whereby, the frequency of the shifted reference carrier modulated counterclockwise beam is constantly adjusted to compensate for effective path length changes due to body rate inputs to said passive ring resonator gyroscope sensitive axis.

9. The passive ring resonator gyroscope of claim 7 wherein said first servo amplifier means responsive to said optical path length control signal further comprises:

a LOCK-IN amplifier means having a first input coupled to said CW intensity control signal, a second input responsive to said dither signal for mixing and amplifying said optical pathlength control signal with said dither signal and for providing an amplified clockwise control signal;

an integrator means having an input responsive to said amplified clockwise control signal for providing an integrated error signal;

a high voltage amplifier means having an input coupled to said integrated clockwise control signal for providing said first cavity path length control signal.

10. The Passive Ring Laser Gyroscope of claim 7, wherein said first cavity path length adjusting means further comprises:

at least one electromechanical transducer having a reflective surface positioned to adjust said first resonator optical path length to maximize said second resonator reference carrier modulated clockwise beam intensity and having input terminals coupled to receive said first cavity path length control signal.

11. The passive ring resonator gyroscope of claim 8 wherein said output servo amplifier means responsive to said CCW intensity control signal further comprises:

a LOCK-IN amplifier means having a first input coupled to said intensity control signal, a second input responsive to said dither signal for providing an amplified frequency control signal;

an integrator means having an input responsive to said amplified frequency control signal for providing an integrated frequency control signal;

an AO servo driver means having a first input coupled to said integrated frequency control signal and having a reference signal generator for providing a predetermined reference frequency signal, a voltage controlled oscillator having a center frequency established by said predetermined reference frequency signal, said voltage controlled oscillator having an input responsive to said integrated frequency control signal for providing a shifted carrier reference signal shifted from said predetermined reference frequency by a frequency difference characterized by said integrated frequency error signal;

a first RF amplifier means responsive to said reference carrier signal for providing a clockwise carrier drive signal having a frequency equal to said reference carrier frequency signal, a second RF amplifier means responsive to said shifted carrier reference signal for providing a counterclockwise carrier drive signal;

a first acousto-optic coupler responsive to said clockwise carrier drive signal for modulating the frequency of said first single frequency light source at a frequency equal to said reference carrier signal frequency; and a second acousto-optic coupler responsive to said counterclockwise carrier drive signal for modulating the frequency of said second single frequency light source at the frequency of said shifted carrier reference signal frequency; and counter means responsive to said reference carrier signal and said shifted carrier reference signal for providing said gyro body rate output signal.

12. The passive ring resonator gyroscope of claim 4 wherein the Free Spectral Range of said first resonator cavity is adjusted to be equal to the Free Spectral Range of said second resonator cavity.

13. The passive ring resonator gyroscope of claim 12 wherein said first resonator cavity is characterized to form a straight linear laser.

14. A passive ring resonator gyroscope having enhanced stability and sensitivity comprising:

a single piece body having an integral first and second resonator cavity;

said first resonator cavity having a transmitting optical port means for transmitting stabilized single frequency light, and at least two internal body-mounted reflective surfaces each reflective surface being coupled to and mechanically spaced by said body, a gain medium contained in said first resonator cavity;

means for exciting said gain medium to induce lasing in said first resonator cavity to provide said stabilized single frequency light source, said single frequency light source being directed through said first resonator transmitting optical port means out of said first resonator;

a dither signal means for providing a dither signal and for modulating the optical path lengths of said first and second cavities at dither signal frequency;

a reference signal generator for providing a reference carrier signal;

said second resonator cavity being evacuated and having:

a receiving optical port means for receiving stabilized single frequency light; said second resonator having at least three reflective surfaces forming a closed optical path, said closed optical path enclosing an area, said passive ring resonator gyroscope sensitive axis being normal to the plane of said area;

means for beamsteering said single frequency light exiting said first resonator cavity transmitting port means and for providing first and second single frequency light sources to said second resonator cavity receiving optical port means;

said means for beamsteering coupling said first and second single frequency light sources into said second resonator cavity to provide clockwise and counterclockwise beams respectively within said second resonator closed optical path;

cavity servo means having a single servo responsive to said dither signal for modulating said first single frequency light source with said reference carrier signal, to provide a reference carrier modulated clockwise beam, said cavity servo means being responsive to the intensity of said clockwise beam for adjusting the path length of said first resonator cavity to maximize the intensity of said reference carrier modulated clockwise beam, and output servo means responsive to said dither signal for modulating the second single frequency light source with a shifted reference carrier signal to provide a shifted reference carrier modulated counter clockwise beam, said output servo means being responsive to the amplitude of said shifted reference carrier modulated counterclockwise beam for adjusting the frequency of said shifted reference carrier signal frequency to maximize the intensity of said shifted reference carrier modulated counterclockwise beam;

said first and second resonator cavities inducing output signal frequency bias error in response to body dimension changes;

said second resonator cavity being positioned and dimensioned in relation to said first resonator cavity to experience relatively equivalent optical path length changes in response to induced body dimension changes;

means for detecting the frequency difference between said reference carrier and said shifted reference carrier signals in response to rotation of said single piece body on said sensitive axis and to provide a sensitive axis output signal;

whereby, bias errors induced body dimension changes or to changes from external forces applied to said body are diminished.

* * * * *

UNITED STATES PATENT AND TRADEMARK OFFICE
CERTIFICATE OF CORRECTION

PATENT NO. : 5,100,236
DATED : March 31, 1992
INVENTOR(S) : Kie L. SooHoo and Timothy J. Valle It is certified that error appears in the above-identified patent and that said Letters Patent is hereby corrected as shown below:

Title page, item [19] and [75] should read
--Kie L. SooHoo--.

Signed and Sealed this

Twenty-second Day of June, 1993

Attest:

MICHAEL K. KIRK

*Attesting Officer*        *Acting Commissioner of Patents and Trademarks*